United States Patent
Khanra et al.

(10) Patent No.: US 12,295,041 B2
(45) Date of Patent: May 6, 2025

(54) METHOD AND APPARATUS FOR OPTIMIZED SHORT PRACH PREAMBLE DETECTION

(71) Applicant: Rakuten Symphony, Inc., Tokyo (JP)

(72) Inventors: Manuj Mohan Khanra, Bangalore (IN); Ronak Lalwala, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/802,566

(22) PCT Filed: Jun. 30, 2022

(86) PCT No.: PCT/US2022/035685
§ 371 (c)(1),
(2) Date: Aug. 26, 2022

(87) PCT Pub. No.: WO2024/005821
PCT Pub. Date: Jan. 4, 2024

(65) Prior Publication Data
US 2024/0196440 A1    Jun. 13, 2024

(51) Int. Cl.
*H04W 74/0833* (2024.01)
*H04W 52/24* (2009.01)
*H04W 56/00* (2009.01)

(52) U.S. Cl.
CPC ....... *H04W 74/0833* (2013.01); *H04W 52/24* (2013.01); *H04W 56/001* (2013.01)

(58) Field of Classification Search
None
See application file for complete search history.

(56) References Cited

U.S. PATENT DOCUMENTS

2007/0285817 A1* 12/2007 Lau ............... G11B 5/59688
                                                    360/39
2012/0219077 A1*  8/2012 Chang ........... H04L 27/2692
                                                    375/259
(Continued)

OTHER PUBLICATIONS

International Search Report dated Nov. 9, 2022 issued by the International Searching Authority in Application No. PCT/US22/35685.

(Continued)

*Primary Examiner* — Xavier S Wong
(74) *Attorney, Agent, or Firm* — Sughrue Mion, PLLC

(57) ABSTRACT

A method performed in at least one processor of a network node includes receiving, from at least one user equipment (UE) over a wireless communication network, a plurality of physical random access channel (PRACH) preamble sequences in the frequency domain. The method further includes determining, in the frequency domain, an average of the received plurality of preamble sequences. The method further includes performing a correlation function between the average of the received plurality of preamble sequences and a base sequence. The method further includes converting an output of the correlation function to the time domain to generate time domain samples in a sampling window. The method further includes determining power samples from the time domain samples. The method further includes performing a search of the power samples in the sampling window for a peak corresponding to the plurality of PRACH preamble sequences.

21 Claims, 11 Drawing Sheets

(56) References Cited

U.S. PATENT DOCUMENTS

| | | |
|---|---|---|
| 2013/0202019 A1 | 8/2013 | Lo et al. |
| 2018/0077730 A1* | 3/2018 | Kim .................. H04W 74/0833 |
| 2018/0235013 A1* | 8/2018 | Jung .................. H04W 74/006 |
| 2019/0132882 A1 | 5/2019 | Li et al. |
| 2020/0008243 A1 | 1/2020 | Choi et al. |
| 2021/0014694 A1* | 1/2021 | Li .......................... H04W 16/14 |
| 2021/0120593 A1* | 4/2021 | Carlsson ............... H04L 5/0053 |
| 2021/0399809 A1* | 12/2021 | Igarashi .................. H04L 27/20 |
| 2023/0108510 A1* | 4/2023 | Wang ................... H04L 5/0051 |
| | | 370/329 |

OTHER PUBLICATIONS

Written Opinion dated Nov. 9, 2022 issued by the International Searching Authority in Application No. PCT/US22/35685.

* cited by examiner for nRxAnt for nRepetition $$corr[n]_{nRep} = conj(x[n]_{nRep}) * b[n]_{nRep}$$
$$L(t)_{nRep} = ifft_N(corr[n]_{nRep})$$
$$ldAbs(t) = \sum_{0}^{nRep} |L(t)_{nRep}|^2$$

end # nRepetition end #nRxAnt

FIG. 4 for nRxAnt $$x[n]' = mean\left(sum(x[n]_{nRep})\right)$$

$$corr[n]_{nAnt} = conj(x[n]') * b[n]$$

$$L(t)_{nAnt} = ifft_N(corr[n]_{nAnt})$$

end #nRxAnt $$ldAbs(t) = \sum_{0}^{nAnt} |L(t)_{nAnt}|^2$$

FIG. 5 for nRxAnt

~~for nRepetition~~

$$x[n]' = mean\left(sum(x[n]_{nRep})\right)$$

~~end # nRepetition~~

$$corr[n]_{nAnt} = conj(x[n]') * b[n]$$

~~end # nRxAnt~~

~~for nRepetition~~

~~for nRxAnt~~

$$L(t)_{nAnt} = ifft_N(corr[n]_{nAnt})$$

end #nRxAnt $$ldAbs(t) = \sum_{0}^{nAnt} |L(t)_{nAnt}|^2$$

~~end # nRepetition~~

| Number of TX antennas | Number of RX antennas | Propagation conditions and correlation matrix (annex G) | Frequency offset | SNR (dB) | | | | | |
|---|---|---|---|---|---|---|---|---|---|
| | | | | Burst format A1 | Burst format A2 | Burst format A3 | Burst format B4 | Burst format C0 | Burst format C2 |
| 1 | 2 | AWGN | 0 | -8.8 | -11.7 | -13.5 | -16.2 | -6.9 | -11.6 |
| | | TDLC300-100 Low | 400 Hz | -2.2 | -5.1 | -6.8 | -9.3 | 0.7 | -5.0 |
| | 4 | AWGN | 0 | -11.1 | -13.9 | -15.6 | -18.7 | -8.3 | -13.9 |
| | | TDLC300-100 Low | 400 Hz | -6.5 | -9.8 | -11.4 | -13.9 | -3.9 | -9.8 |
| | 8 | AWGN | 0 | -13.4 | -16.3 | -17.8 | -20.8 | -10.7 | -16.2 |
| | | TDLC300-100 Low | 400 Hz | -10.1 | -13.1 | -14.5 | -17.0 | -7.2 | -13.1 |

| PDP 84 channel | Nos ds snAnt | XCRR | (F) PROPOSED LLS | ALGO GAIN | \multicolumn{10}{c|}{TA added every slot for simulation (in usecs) and Gain of each, w.r.t 3GPP} |
|---|---|---|---|---|---|---|---|---|---|---|---|---|---|---|
| | | | | | 1us | Gain(1) | 2us | Gain(2) | 3us | Gain(3) | 4us | Gain(4) | 5us | Gain(5) |
| AWGN | 1* | -13.7 | -17.5 | 3.8 | -16.1 | 2.4 | -16.1 | 2.4 | -16.1 | 2.4 | -16 | 2.3 | -16 | 2.3 |
| TDLC | 1* | -4.8 | -7.2 | 2.4 | -6.9 | 2.1 | -6.7 | 1.9 | -6.5 | 1.7 | -6.2 | 1.4 | -6.1 | 1.3 |
| AWGN | 2 | -16.2 | -19.9 | 3.7 | -18.5 | 2.3 | -18.5 | 2.3 | -18.5 | 2.3 | -18.5 | 2.3 | -18.5 | 2.3 |
| TDLC | 2 | -9.3 | -12.5 | 3.2 | -12.1 | 2.8 | -12.1 | 2.8 | -12 | 2.7 | -12 | 2.7 | -11.9 | 2.6 |
| AWGN | 4 | -18.7 | -22.5 | 3.5 | -21 | 2.3 | -21 | 2.3 | -20.9 | 2.2 | -21 | 2.3 | -21 | 2.3 |
| TDLC | 4 | -13.9 | -17.2 | 3.3 | -16.5 | 2.6 | -16.5 | 2.6 | -16.4 | 2.5 | -16.4 | 2.5 | -16.5 | 2.6 |

FIG. 10

METHOD AND APPARATUS FOR OPTIMIZED SHORT PRACH PREAMBLE DETECTION

CROSS REFERENCE TO RELATED APPLICATIONS

This application is a National Stage of International Application No. PCT/US2022/035685 filed Jun. 30, 2022.

TECHNICAL FIELD

The present disclosure relates generally to communication systems, and more particularly to methods and apparatuses for Physical Random Access Channel (PRACH) preamble detection.

BACKGROUND

The physical random access channel (PRACH) is used in the uplink of wireless communication systems (e.g., cellular systems) for initial access requests from wireless terminals (e.g., user equipment). In this regard, the PRACH is a shared channel used by wireless terminals to access a wireless communication system (TDMA/FDMA, and CDMA based network) for data transmission. For example, whenever a wireless terminal needs to transmit uplink data, the wireless terminal obtains uplink synchronization with the wireless communication via a PRACH process to properly schedule the transmission of the uplink data. The PRACH process may include the wireless terminal transmitting one or more preamble sequences to a network node such as a base station, where the base station performs a PRACH detection process to identify the wireless terminal and schedule the uplink transmission.

The conventional PRACH detection process relies on performing a correlation on each PRACH preamble sequence with a base sequence, and converting the correlated PRACH preamble sequence to the time domain. However, the conventional PRACH detection process does not properly detect a PRACH preamble sequence when the channel is experiencing suboptimal conditions. For example, the conventional PRACH detection process does not properly detect the PRACH preamble sequence when there is channel fading or bad reflections in the channel. Furthermore, the conventional PRACH detection process does not meet the gains specified in the 3GPP standard (e.g., 38.141-1(v16.9.0), Table 8.4.1.5-2/8.4.1.5-3). Additionally, the conventional PRACH detection process is inefficient since this process requires more computational cycles for every repetition of the preamble sequence.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for . . . are disclosed by the present disclosure.

According to exemplary embodiments, a method performed in at least one processor of a network node includes receiving, from at least one user equipment (UE) over a wireless communication network, a plurality of physical random access channel (PRACH) preamble sequences in the frequency domain. The method further includes determining, in the frequency domain, an average of the received plurality of preamble sequences. The method further includes performing a correlation function between the average of the received plurality of preamble sequences and a base sequence. The method further includes converting an output of the correlation function to the time domain to generate time domain samples in a sampling window. The method further includes determining power samples from the time domain samples. The method further includes performing a search of the power samples in the sampling window for a peak corresponding to the plurality of PRACH preamble sequences.

According to exemplary embodiments, a network node includes at least one memory configured to store computer program code, and at least one processor configured to access said at least one memory and operate as instructed by the computer program code. The computer program code includes receiving code configured to cause at least one of said at least one processor to receive, from at least one user equipment (UE) over a wireless communication network, a plurality of physical random access channel (PRACH) preamble sequences in the frequency domain. The computer program code further includes averaging code configured to cause at least one of said at least one processor to determine, in the frequency domain, an average of the received plurality of preamble sequences. The computer program code further includes correlation code configured to cause at least one of said at least one processor to perform a correlation function between the average of the received plurality of preamble sequences and a base sequence. The computer program code further includes converting code configured to cause at least one of said at least one processor to convert an output of the correlation function to the time domain to generate time domain samples in a sampling window. The computer program code further includes first determining code configured to cause at least one of said at least one processor to determine power samples from the time domain samples. The computer program code further includes searching code configured to cause at least one of said at least one processor to perform a search of the power samples in the sampling window for a peak corresponding to the plurality of PRACH preamble sequences.

A non-transitory computer readable medium having instructions stored therein, which when executed by at least one processor in a network node cause the at least one processor to execute a method that includes receiving, from at least one user equipment (UE) over a wireless communication network, a plurality of physical random access channel (PRACH) preamble sequences in the frequency domain. The method further includes determining, in the frequency domain, an average of the received plurality of preamble sequences. The method further includes performing a correlation function between the average of the received plurality of preamble sequences and a base sequence. The method further includes converting an output of the correlation function to the time domain to generate time domain samples in a sampling window. The method further includes determining power samples from the time domain samples. The method further includes performing a search of the power samples in the sampling window for a peak corresponding to the plurality of PRACH preamble sequences.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIG. 4 is an example algorithm of performing PRACH detection, in accordance with various embodiments of the present disclosure.

FIG. 5 is an example algorithm of performing PRACH detection, in accordance with various embodiments of the present disclosure.

FIG. 6 is illustrates differences between the PRACH detection algorithm illustrated in FIG. 5 and the PRACH detection algorithm illustrated in FIG. 4.

FIG. 9 illustrates an example table of PRACH missed detection test requirements, in accordance with various embodiments of the present disclosure.

FIG. 10 illustrates an example table demonstrating performance gains, in accordance with various embodiments of the present disclosure.

DETAILED DESCRIPTION

Figure 1:
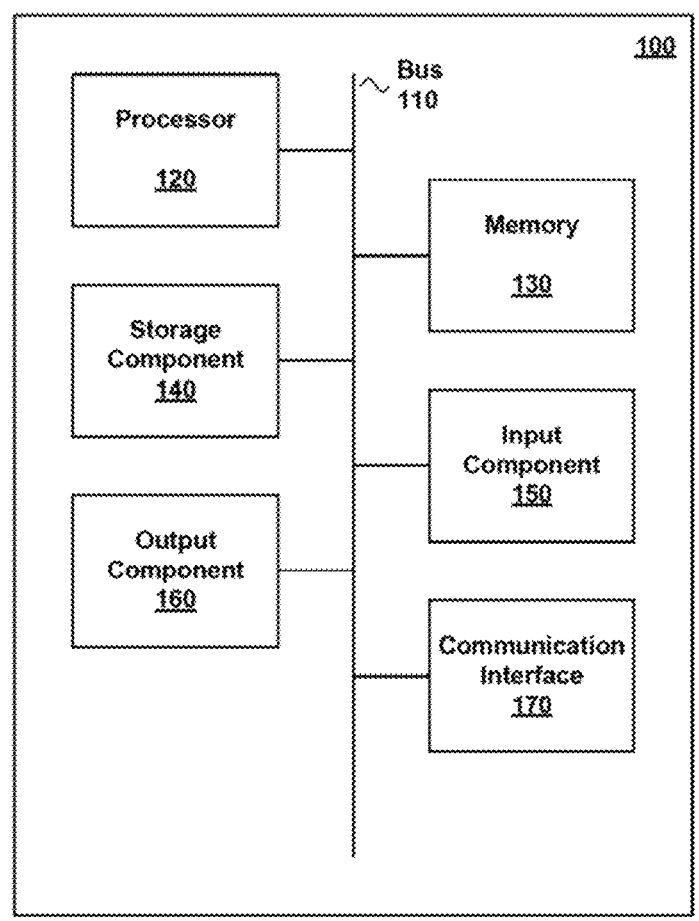
FIG. 1 is a diagram of an example network device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to performing a PRACH detection process. In some embodiments, the PRACH detection process may be performed on short preamble sequences containing 139 samples or less. In some embodiments, the preamble sequences are transmitted a predetermined number of times (e.g., predetermined number of repetitions) and summed in the frequency domain before a search for a peak is performed in the time domain. For example, the preamble sequence may be transmitted to a network node 12 or more times.

FIG. 1 is diagram of an example device for performing PRACH detection. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
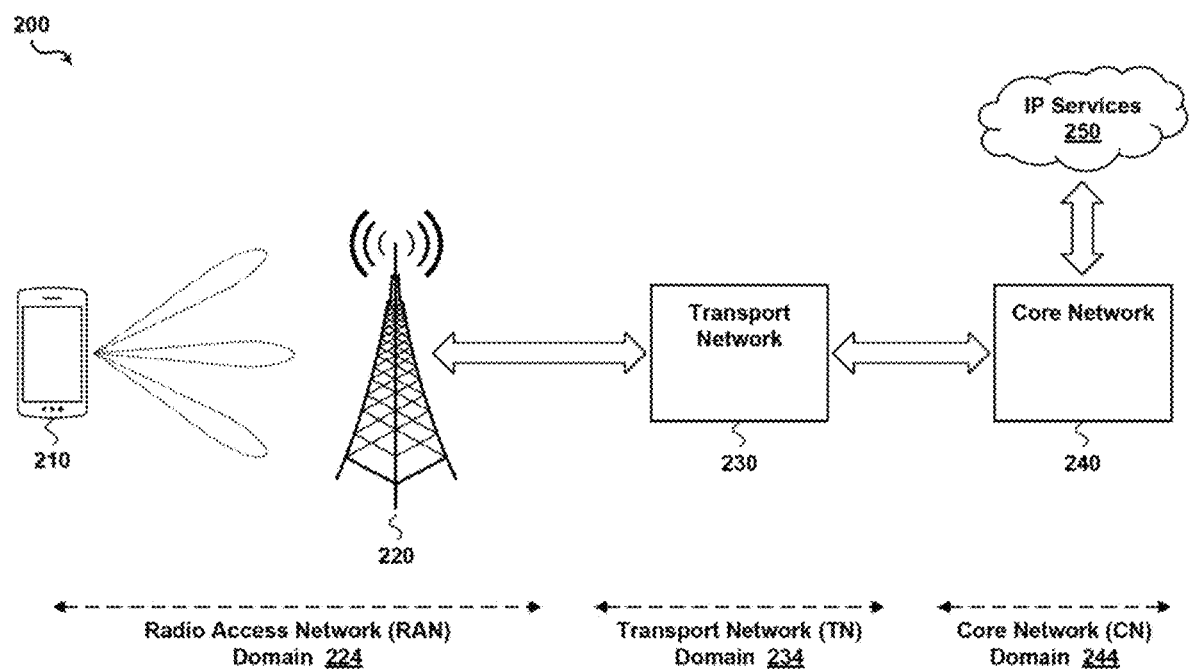
FIG. 2 is a schematic diagram of an example wireless communications system, in accordance with various embodiments of the present disclosure.

FIG. 2 is a diagram illustrating an example of a wireless communications system, according to various embodiments of the present disclosure. The wireless communications system 200 (which may also be referred to as a wireless wide area network (WWAN)) may include one or more user equipment (UE) 210, one or more base stations 220, at least one transport network 230, and at least one core network 240. The device 100 (FIG. 1) may be incorporated in the UE 210 or the base station 220.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macrocells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

Figure 3:
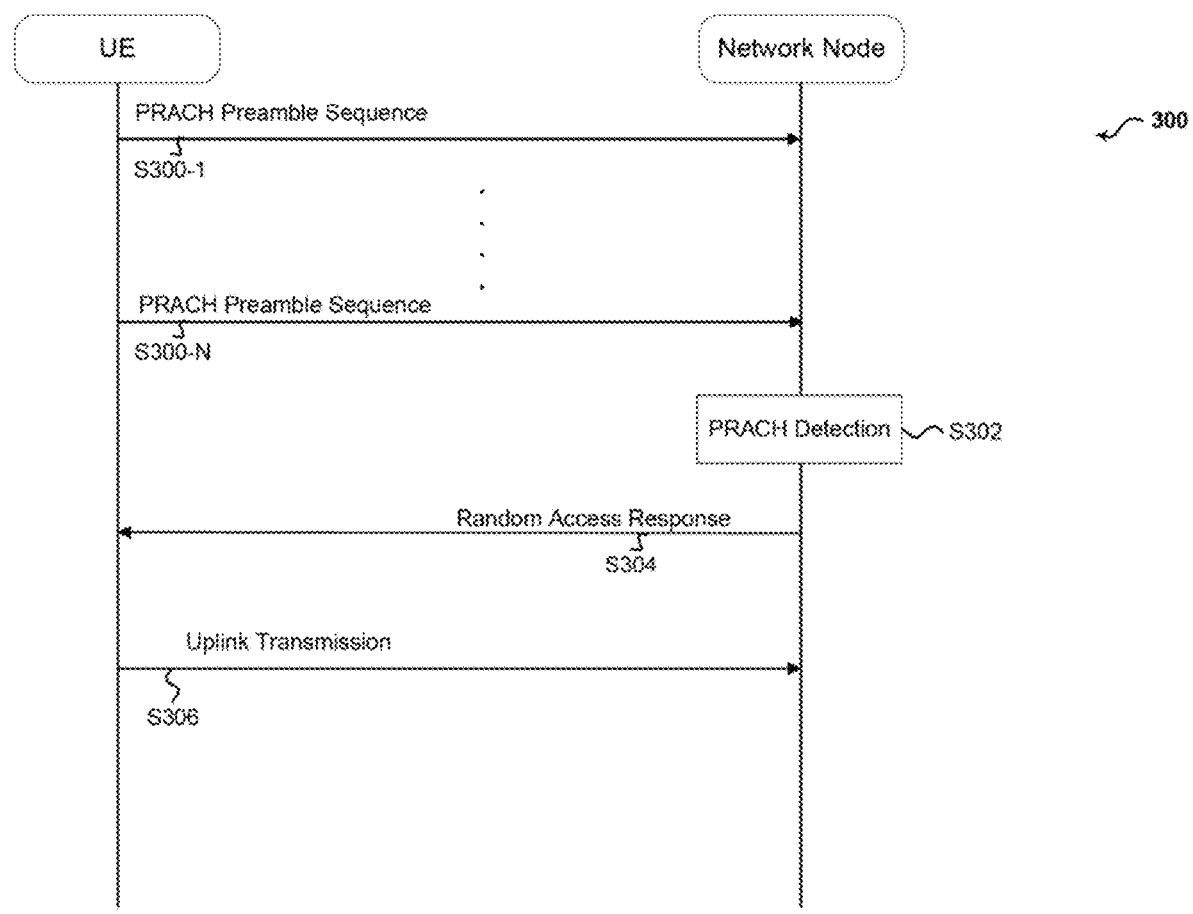
FIG. 3 is an example sequence diagram of an up link synchronization process between a UE and a network node, in accordance with various embodiments of the present disclosure.

FIG. 3 illustrates an example sequence diagram between a UE and the network node such as base station 220 for establishing uplink synchronization via the PRACH. For example, the UE may transmit N PRACH preamble sequences (S300-1 to S300-N) from the UE to the network node. After receiving the N PRACH preamble sequences, the network node may perform a PRACH detection process S302, as disclosed in further detail infra. In some embodiments, as a result of performing the PRACH detection process, the network node identifies the UE that sent the PRACH preamble sequence. After performing the PRACH detection process, the network node may send a Random Access Response (S304) to the UE identified in the PRACH detection process. The Random Access Response may contain information regarding an uplink transmission schedule. In step S306, the UE may transmit uplink data in accordance with the uplink transmission schedule indicated in the Random Access Response.

FIG. 4 illustrates an example PRACH detection algorithm in which each individual PRACH preamble sequence is correlated with a base sequence and subsequently converted to the time domain. The loop for nRepetition corresponds to the number of PRACH preamble sequences transmitted from the UE to the network node. The loop for nRxAnt corresponds to the number antennas at the network node. The variable $corr[n]_{nRep}$ represents the correlation between an individual PRACH preamble sequence ($x[n]_{nRep}$) and a base sequence ($b[n]_{nRep}$). The base sequence may be a Zadoff-Chu sequence. The variable $L(t)_{nRep}$ represents the lag domain (e.g. time domain) transformation of $corr[n]_{nRep}$.

For example, the inverse Fourier Transform may be performed on corr[n]$_{nRep}$. The variable ldAbs(t) represents the power value of the time domain value for each individual PRACH preamble sequence.

The PRACH detection algorithm illustrated in FIG. 4 may not perform well in suboptimal channel conditions. For example, when the PRACH experiences fading conditions, the correlation between the PRACH preamble sequence and the base sequence may not be performed properly, thereby leading to improper detection of the peak.

FIG. 5 illustrates an embodiment of a PRACH detection algorithm in which PRACH preamble sequences are summed in the frequency domain before correlation and conversion to the lag domain. The variable x[n]' represents an average of each PRACH preamble sequence. For example, if the UE transmits 12 PRACH preamble sequences, x[n]' is the average of the 12 PRACH preamble sequences. The average of each PRACH preamble sequence may be correlated with the base sequence (corr[n]$_{nAnt}$) and converted to the time domain (L(t)$_{nAnt}$). After these steps are performed for each antenna, the power value (ldAbs(t)) may be obtained for each sample in the time domain. FIG. 6 illustrates the differences between the embodiment of the PRACH detection algorithm illustrated in FIG. 5 and the PRACH detection algorithm illustrated in FIG. 4.

Figure 7:
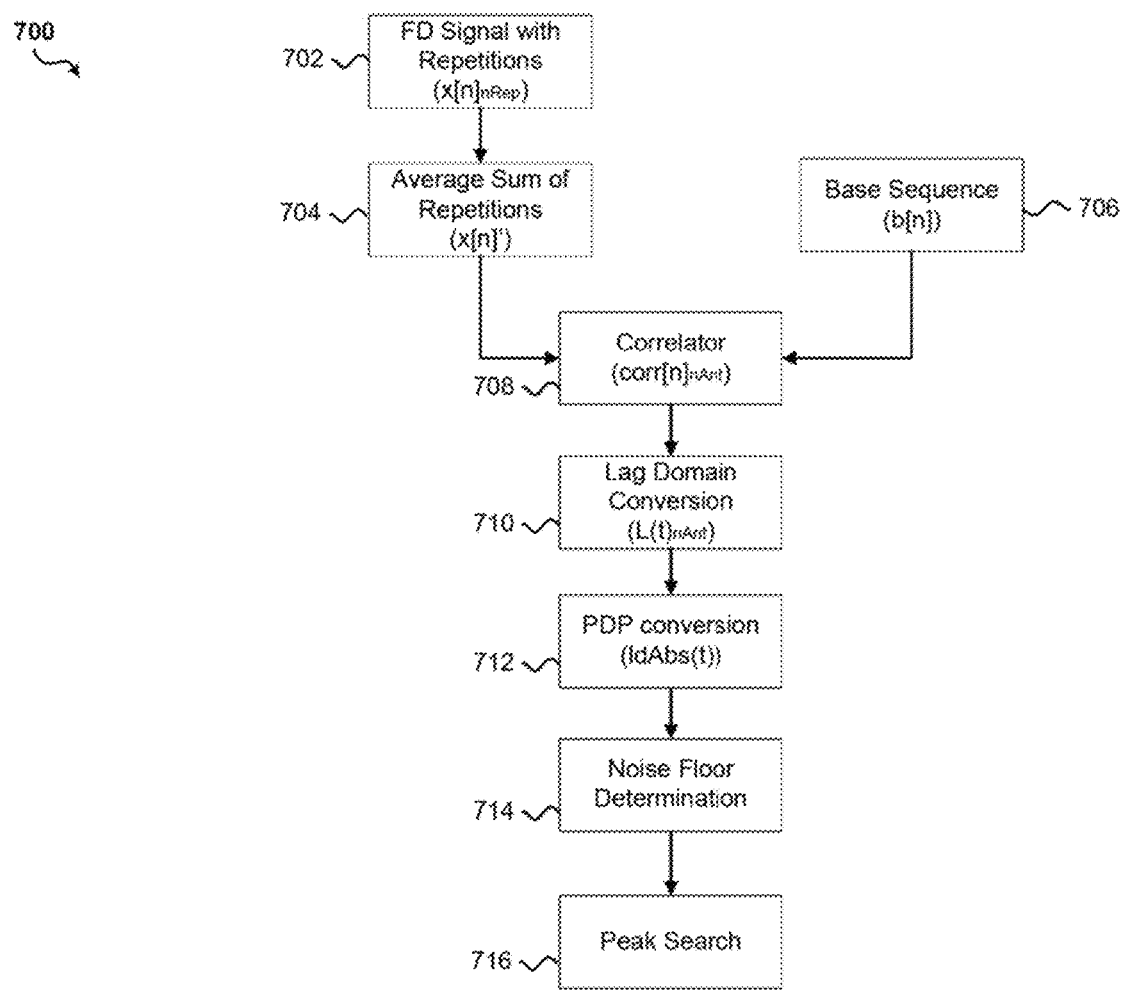
FIG. 7 is example block diagram implementing the PRACH detection algorithm illustrated in FIG. 5, in accordance with various embodiments of the present disclosure.

FIG. 7 illustrates an example block diagram for implementing the PRACH detection algorithm illustrated in FIG. 5. The block diagram may start with a frequency domain signal corresponding to the N repetitions of the PRACH preamble sequence 702. The frequency domain signal may be provided to block 704 to produce an average of the repetitions of the PRACH preamble sequence. The output of block 704 along with a base sequence 706 may be provided to correlator 708 to perform a correlation function. FIGS. 8(a) and (b) illustrate example signal diagrams of the PRACH preamble sequence and the base sequence, respectively. FIG. 8(c) illustrates an example signal diagram illustrating an output of the correlation performed at block 708. The output of block 708 may be provided to block 710 to perform a lag domain conversion (e.g., time domain conversion). For example, the inverse Fourier Transform may be performed on the output of block 708 to generate time domain samples. FIG. 8(d) illustrates an example signal diagram of the output of the lag domain conversion including peak 802 in sampling window 800.

The output of block 710 may be provided to block 712 to perform a power conversion on the time domain samples to generate power samples. FIG. 8(e) illustrates an example signal diagram of the power samples generated at block 712. The output of block 712 may be provided to block 714 to perform a noise floor determination. For example, the noise floor determination may be obtained by performing a peak to peak average ratio calculation on the power samples generated in block 712. FIG. 8(f) illustrates an example signal diagram with the determined noise floor 804. Furthermore, in some embodiments, a noise threshold 806 may be set to a power level greater than or equal to the noise floor.

A peak search 716 may be performed on the output of block 714. For example, a peak search 716 may be performed in sampling window 800 to identify peak 802. FIGS. 8(g)-(i) illustrate using a search window 808 in sampling window 800. For example, the sampling window 800 may have a size of K samples, and the search window 808 may have a size of k samples, where k<K. As illustrated in FIGS. 8(g)-(i), the search window 808 may traverse the sampling window 800 to identify a peak such as peak 802 that is above the noise threshold 804.

In some embodiments, after the peak is detected, the network node may decode a preamble ID and determine an ID of the UE that sent the PRACH preamble sequence.

As illustrated in FIGS. 8(g)-(i), the embodiment of the PRACH detection algorithm illustrated in FIG. 5 produces the detectable peak 802. In this regard, even if the PRACH experiences suboptimal conditions, the peak 802 is produced in accordance with the PRACH detection algorithm illustrated in FIG. 5. In contrast, the PRACH detection algorithm illustrated in FIG. 4 may not produce the detectable peak 802 when the PRACH experiences suboptimal conditions. For example, under suboptimal conditions, the PRACH detection algorithm illustrated in FIG. 4 may produce a distorted peak spread across the sampling window 800 and/or produce samples that do not exceed the noise threshold 804.

The embodiment of the PRACH detection algorithm illustrated in FIG. 5 requires fewer computational cycles compared to the PRACH detection algorithm illustrated in FIG. 4. Furthermore, the embodiment of the PRACH detection algorithm illustrated in FIG. 5 provides higher performance than the embodiment of FIG. 4 when the channel experiences suboptimal conditions.

FIG. 9 illustrates table 900 which corresponds to table 8.4.1.5-3 from the 3GPP standard illustrating the expected performance requirements. For example, for burst format B4 in which the number antennas is 2, the expected gain is −16.2 dB. FIG. 10 illustrates table 1000 that shows a performance comparison of the B4 format between the 3GPP format and the PRACH detection algorithm illustrated in FIG. 5. For example, as illustrated in FIG. 10, when the number of antennas is 2 for an additive white Gaussian noise (AWGN) channel, the expected gain for the 3GPP standard is −16.2 dB, and the expected gain for the PRACH detection algorithm illustrated in FIG. 5 is −19.9. Therefore, the PRACH detection algorithm illustrated in FIG. 5 is capable of producing a detectable peak with channel conditions that are 3.7 dB worse than the 3GPP standard. As illustrated in FIG. 10, the PRACH detection algorithm illustrated in FIG. 5 consistently performs better than the 3GPP standard even if there is a 1 µs, 2 µs, 3 µs, 4 µs, or 5 µs delay. The 3GPP standard does not define performance requirements for 1 antennae. Accordingly, table 1000 provides extrapolated values for 1 antennae based on the values for 2 and 4 antennas.

Figure 11:
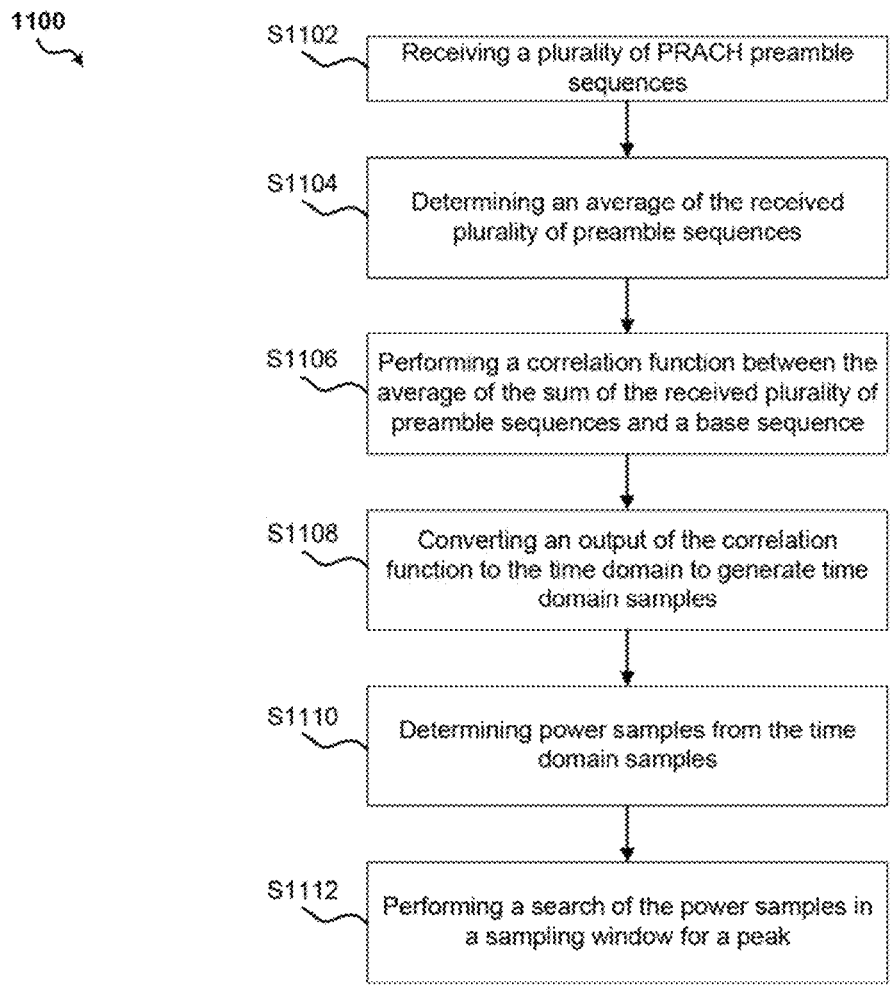
FIG. 11 illustrates a flow chart of an example PRACH detection process, in accordance with various embodiments of the present disclosure.

FIG. 11 is a flow chart of an embodiment of a process 1100 for a performing PRACH detection process. The process illustrated in FIG. 11 may be performed by a network node such as base station 220 (FIG. 2). The process may start at step S1102 where a plurality of PRACH preamble sequences are received. For example, the UE may transmit N PRACH preamble sequences to the network node. The process may proceed to step S1104 where an average of the received plurality of preamble sequences is determined. For example, the variable x[n]' as illustrated in FIG. 5 may be calculated at step S1104. The process may proceed to step S1106 where a correlation function between the average of the received plurality of preamble sequences and a base sequence is performed. For example, the variable corr[n]$_{nAnt}$ as illustrated in FIG. 5 may be calculated at step S1106. The process may proceed to step S1108 where an output of the correlation function is converted to the time domain to generate time domain samples. For example, the variable L(t)$_{nAnt}$ as illustrated in FIG. 5 may be calculated at step S1108.

Figure 8:
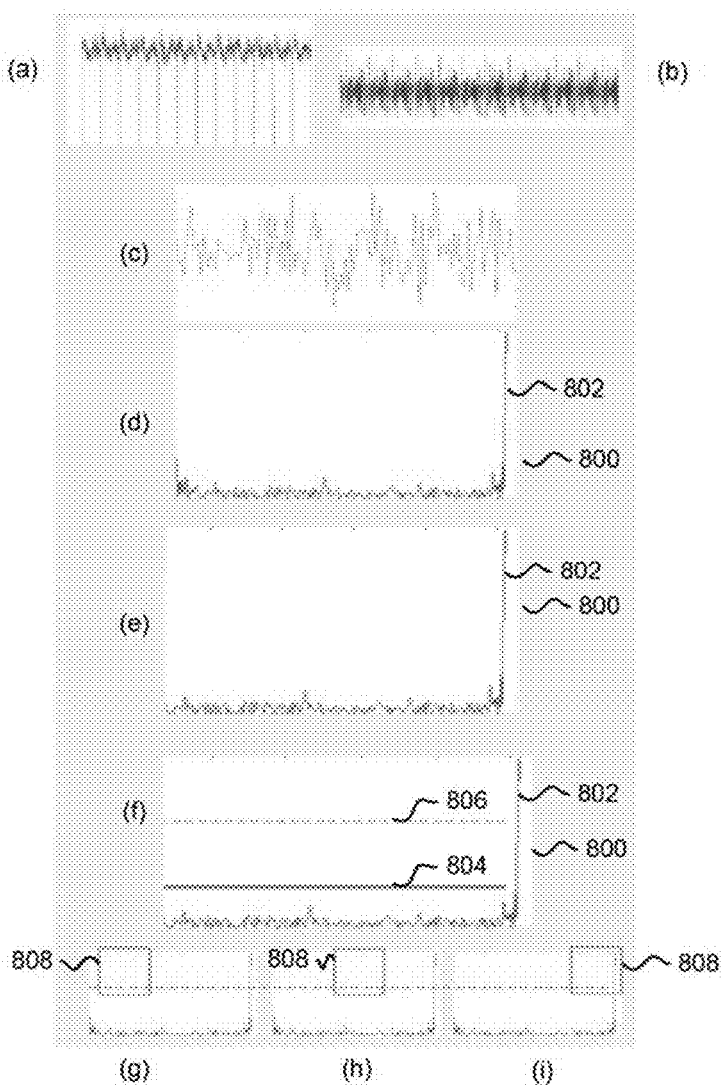
FIGS. 8(a)-(i) illustrate example signal diagrams, in accordance with various embodiments of the present disclosure.

The process may proceed to step S1110 where power samples from the time domain samples are determined. For example, the variable ldAbs(t) as illustrated in FIG. 5 may be calculated at step S1110. Steps S1104-S1110 may be repeated for each antenna of the network node. The process may proceed to step S1112 where a search of the power samples in a sampling window for a peak is performed. For example, the search of the power samples as illustrated in FIGS. 8(*g*)-(*i*) may be performed to identify peak 802. The process illustrated in FIG. 11 may be terminated after step S1112.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

The above disclosure also encompasses the embodiments listed below:

(1) A method performed in at least one processor of a network node includes receiving, from at least one user equipment (UE) over a wireless communication network, a plurality of physical random access channel (PRACH) preamble sequences in the frequency domain; determining, in the frequency domain, an average of the received plurality of preamble sequences: performing a correlation function between the average of the received plurality of preamble sequences and a base sequence: converting an output of the correlation function to the time domain to generate time domain samples in a sampling window; determining power samples from the time domain samples: and performing a search of the power samples in the sampling window for a peak corresponding to the plurality of PRACH preamble sequences.

(2) The method according to feature (1), further including determining a noise threshold based on the power samples: and performing, using the noise threshold, the search of the power samples in the sampling window for the peak.

(3) The method according to feature (2), in which the performing the search for the peak from the power samples in the sampling window includes identifying a power sample from the power samples having a power level above the noise threshold.

(4) The method according to any one of features (1)-(3), in which the plurality of preamble sequences includes at least twelve repetitions of the same preamble sequence.

(5) The method according to feature (4), in which each repetition of the preamble sequence is a short preamble sequence including 139 samples or less.

(6) The method according to any one of features (2)-(5), in which the determining the noise threshold includes determining a peak to peak average ratio of the power samples.

(7) The method according to any one of features (1)-(6), further including determining a preamble ID associated with the UE based on the peak.

(8) The method according to any one of features (1)-(7), in which the network node includes a plurality of antennas, and the steps of (i) determining the average of the received plurality of preamble sequences, (ii) performing the correlation function between the average of the received plurality of preamble sequences and the base sequence, and (iii) converting the output of the correlation function to the time domain to generate the time domain samples is performed for each antenna.

(9) A network node including: at least one memory configured to store computer program code: and at least one processor configured to access said at least one memory and operate as instructed by said computer program code, said computer program code including: receiving code configured to cause at least one of said at least one processor to receive, from at least one user equipment (UE) over a wireless communication network, a plurality of physical random access channel (PRACH) preamble sequences in the frequency domain, averaging code configured to cause at least one of said at least one processor to determine, in the frequency domain, an average of the received plurality of preamble sequences, correlation code configured to cause at least one of said at least one processor to perform a correlation function between the average of the received plurality of preamble sequences and a base sequence, converting code configured to cause at least one of said at least one processor to convert an output of the correlation function to the time domain to generate time domain samples in a sampling window, first determining code configured to cause at least one of said at least one processor to determine power samples from the time domain samples: and searching code configured to cause at least one of said at least one processor to perform a search of the power samples in the sampling window for a peak corresponding to the plurality of PRACH preamble sequences.

(10) The network node according to feature (9), in which said computer program code further includes second determining code configured to cause at least one of said at least one processor to determine a noise threshold based on the power samples, and in which the searching code is further configured to cause at least one of said at least one processor to perform, using the noise threshold, the search of the power samples in the sampling window for the peak.

(11) The network node according to feature (10), in which the searching code is further configured to cause at least one of said at least one processor to identify a power sample from the power samples having a power level above the noise threshold.

(12) The network node according to any one of features (9)-(11), in which the plurality of preamble sequences includes at least twelve repetitions of the same preamble sequence.

(13) The network node according to feature (12), in which each repetition of the preamble sequence is a short preamble sequence including 139 samples or less.

(14) The network node according to any one of features (9)-(13), in which the first determining code is further configured to cause at least one of said at least one processor to determine a peak to peak average ratio of the power samples.

(15) The network node according to any one of features (9)-(14), in which said computer program code further includes third determining code configured to cause at least one of said at least one processor to determine a preamble ID associated with the UE based on the peak.

(16) The network node according to any one of features (9)-(15), in which the network node includes a plurality of antennas, and the steps of (i) determining the average of the received plurality of preamble sequences, (ii) performing the correlation function between the average of the received plurality of preamble sequences and the base sequence, and (iii) converting the output of the correlation function to the time domain to generate the time domain samples is performed for each antenna.

(17) A non-transitory computer readable medium having instructions stored therein, which when executed by at least one processor in a network node cause the at least one processor to execute a method including: receiving, from at least one user equipment (UE) over a wireless communication network, a plurality of physical random access channel (PRACH) preamble sequences in the frequency domain: determining, in the frequency domain, an average of the received plurality of preamble sequences: performing a correlation function between the average of the received plurality of preamble sequences and a base sequence: converting an output of the correlation function to the time domain to generate time domain samples in a sampling window: determining power samples from the time domain samples: and performing a search of the power samples in the sampling window for a peak corresponding to the plurality of PRACH preamble sequences.

(18) The non-transitory computer readable medium according to feature (17), in which the method further includes: determining a noise threshold based on the power samples: and performing, using the noise threshold, the search of the power samples in the sampling window for the peak.

(19) The non-transitory computer readable medium according to feature (18), in which the performing the search for the peak from the power samples in the sampling window includes identifying a power sample from the power samples having a power level above the noise threshold.

(20)) The non-transitory computer readable medium according to any one of features (17)-(19), in which the plurality of preamble sequences includes at least twelve repetitions of the same preamble sequence.

What is claimed is:

1. A method performed in at least one processor of a network node, comprising:
    receiving, from at least one user equipment (UE) over a wireless communication network, a plurality of physical random access channel (PRACH) preamble sequences in the frequency domain;
    determining, in the frequency domain, an average of the received plurality of preamble sequences;
    performing, in the frequency domain, a correlation function between the average of the received plurality of preamble sequences and a base sequence;
    converting an output of the correlation function to the time domain to generate time domain samples in a sampling window;
    determining power samples from the time domain samples; and
    performing a search of the power samples in the sampling window for a peak corresponding to the plurality of PRACH preamble sequences.

2. The method according to claim 1, further comprising:
    determining a noise threshold based on the power samples; and
    performing, using the noise threshold, the search of the power samples in the sampling window for the peak.

3. The method according to claim 2, wherein the performing the search for the peak from the power samples in the sampling window includes identifying a power sample from the power samples having a power level above the noise threshold.

4. The method according to claim 1, wherein the plurality of preamble sequences includes at least twelve repetitions of the same preamble sequence.

5. The method according to claim 4, wherein each repetition of the preamble sequence is a short preamble sequence including 139 samples or less.

6. The method according to claim 2, wherein the determining the noise threshold includes determining a peak to peak average ratio of the power samples.

7. The method of claim 1, further comprising determining a preamble identifier ID associated with the UE based on the peak.

8. The method of claim 1, wherein the network node includes a plurality of antennas, and the steps of (i) determining the average of the received plurality of preamble sequences, (ii) performing the correlation function between the average of the received plurality of preamble sequences and the base sequence, and (iii) converting the output of the correlation function to the time domain to generate the time domain samples is performed for each antenna.

9. The method according to claim 1, wherein the performing the search of the power samples in the sampling window for the peak corresponding to the plurality of PRACH preamble sequences comprises using a search window to traverse the sampling window to identify the peak corresponding to the plurality of PRACH preamble sequences, and wherein the search window has a sampling size less than a sampling size of the sampling window.

10. A network node comprising:
    at least one memory configured to store computer program code; and
    at least one processor configured to access said at least one memory and operate as instructed by said computer program code, said computer program code including:
        receiving code configured to cause at least one of said at least one processor to receive, from at least one user equipment (UE) over a wireless communication network, a plurality of physical random access channel (PRACH) preamble sequences in the frequency domain,
        averaging code configured to cause at least one of said at least one processor to determine, in the frequency domain, an average of the received plurality of preamble sequences,
        correlation code configured to cause at least one of said at least one processor to perform, in the frequency domain, a correlation function between the average of the received plurality of preamble sequences and a base sequence,
        converting code configured to cause at least one of said at least one processor to convert an output of the correlation function to the time domain to generate time domain samples in a sampling window,
        first determining code configured to cause at least one of said at least one processor to determine power samples from the time domain samples; and
        searching code configured to cause at least one of said at least one processor to perform a search of the power samples in the sampling window for a peak corresponding to the plurality of PRACH preamble sequences.

11. The network node according to claim 10,
    wherein said computer program code further includes second determining code configured to cause at least one of said at least one processor to determine a noise threshold based on the power samples, and wherein the searching code is further configured to cause at least one of said at least one processor to perform, using the noise threshold, the search of the power samples in the sampling window for the peak.

12. The network node according to claim 11, wherein the searching code is further configured to cause at least one of said at least one processor to identify a power sample from the power samples having a power level above the noise threshold.

13. The network node according to claim 10, wherein the plurality of preamble sequences includes at least twelve repetitions of the same preamble sequence.

14. The network node according to claim 13, wherein each repetition of the preamble sequence is a short preamble sequence including 139 samples or less.

15. The network node according to claim 10, wherein the first determining code is further configured to cause at least one of said at least one processor to determine a peak to peak average ratio of the power samples.

16. The network node of claim 9, wherein said computer program code further includes third determining code configured to cause at least one of said at least one processor to determine a preamble identifier ID associated with the UE based on the peak.

17. The network node of claim 10, wherein the network node includes a plurality of antennas, and the steps of (i) determining the average of the received plurality of preamble sequences, (ii) performing the correlation function between the average of the received plurality of preamble sequences and the base sequence, and (iii) converting the output of the correlation function to the time domain to generate the time domain samples is performed for each antenna.

18. A non-transitory computer readable medium having instructions stored therein, which when executed by at least one processor in a network node cause the at least one processor to execute a method comprising:
   receiving, from at least one user equipment (UE) over a wireless communication network, a plurality of physical random access channel (PRACH) preamble sequences in the frequency domain;
   determining, in the frequency domain, an average of the received plurality of preamble sequences;
   performing, in the frequency domain, a correlation function between the average of the received plurality of preamble sequences and a base sequence;
   converting an output of the correlation function to the time domain to generate time domain samples in a sampling window;
   determining power samples from the time domain samples; and
   performing a search of the power samples in the sampling window for a peak corresponding to the plurality of PRACH preamble sequences.

19. The non-transitory computer readable medium according to claim 18, wherein the method further comprises:
   determining a noise threshold based on the power samples; and
   performing, using the noise threshold, the search of the power samples in the sampling window for the peak.

20. The non-transitory computer readable medium according to claim 19, wherein the performing the search for the peak from the power samples in the sampling window includes identifying a power sample from the power samples having a power level above the noise threshold.

21. The non-transitory computer readable medium according to claim 18, wherein the plurality of preamble sequences includes at least twelve repetitions of the same preamble sequence.

* * * * *